US012258079B2

(12) United States Patent
Baudouin

(10) Patent No.: US 12,258,079 B2
(45) Date of Patent: Mar. 25, 2025

(54) METHOD FOR COMPENSATING FOR FRICTION IN A POWER STEERING SYSTEM

(71) Applicant: JTEKT EUROPE, Irigny (FR)

(72) Inventor: Nicolas Baudouin, Oullins (FR)

(73) Assignee: JTEKT EUROPE, Irigny (FR)

( * ) Notice: Subject to any disclaimer, the term of this patent is extended or adjusted under 35 U.S.C. 154(b) by 138 days.

(21) Appl. No.: 18/018,405

(22) PCT Filed: Jul. 21, 2021

(86) PCT No.: PCT/FR2021/051366
§ 371 (c)(1),
(2) Date: Jan. 27, 2023

(87) PCT Pub. No.: WO2022/023649
PCT Pub. Date: Feb. 3, 2022

(65) Prior Publication Data
US 2023/0294758 A1    Sep. 21, 2023

(30) Foreign Application Priority Data
Jul. 30, 2020   (FR) ...................... 20/08133

(51) Int. Cl.
*B62D 5/04*     (2006.01)
*B62D 6/10*     (2006.01)
(52) U.S. Cl.
CPC ......... *B62D 5/0463* (2013.01); *B62D 5/0481* (2013.01); *B62D 6/10* (2013.01)
(58) Field of Classification Search
CPC ....... B62D 5/0463; B62D 5/0481; B62D 6/10
(Continued)

(56) References Cited

U.S. PATENT DOCUMENTS 11,608,107 B2 *   3/2023   Kim .................... B62D 5/0463
11,654,959 B2 *   5/2023   Guilemond .......... B62D 5/0481
                                                            180/443
(Continued)

FOREIGN PATENT DOCUMENTS

EP    2735495 A2    5/2014
WO    2019092341 A1    5/2019

OTHER PUBLICATIONS

International Search Report (English) dated Oct. 14, 2021; PCT Application No. PCT/FR2021/051366, Filed Jul. 21, 2021; 3 pages.
(Continued)

Primary Examiner — Hai H Huynh
(74) Attorney, Agent, or Firm — CANTOR COLBURN LLP

(57) ABSTRACT

Method for compensating for a friction between at least two parts, the method being based on a friction model (M), a speed (v) between at least one part and at least one other part of the at least two parts, the speed being measured, or estimated from a measurement, the speed (v) being input data of the model (M), the model (M) being based on an internal state (z) of friction, a time derivative (ż) of the internal state (z) being a function of said internal state and of the speed (v) and of a first gain (σ), the method comprising a step of saturation of the speed v at the input of the friction model, so that an absolute value |v| of the speed (v) remains lower than a saturation value, the saturation value being a function of the speed, of the first gain and of a second gain.

20 Claims, 1 Drawing Sheet

(58) Field of Classification Search
USPC .................................................. 701/41–44
See application file for complete search history.

(56) References Cited

U.S. PATENT DOCUMENTS 11,656,137 B2* 5/2023 Guilemond .......... B62D 5/0481
702/33
2016/0280255 A1 9/2016 Wilhelm et al.

OTHER PUBLICATIONS

International Search Report (non-English) dated Oct. 14, 2021; PCT Application No. PCT/FR2021/051366, Filed Jul. 21, 2021; 5 pages.
Tamura, T. et al. "Modeling and Simulation for Dynamic Analysis of Column Type Electric Power Steering", Technical Paper, Jan. 1, 2013, pp. 19-25.
Wilhelm, F. et al. "Friction Compensation Control for Power Steering", IEEE Transactions on Control Systems Technology, vol. 24, No. 4, Jul. 2016, pp. 1354-1367.
Wilhelm, F. et al. "Modeling and Compensating Friction in Power Steering", 2015 European Control Conference (ECC), Jul. 15-17, 2015, pp. 2138-2143.
Written Opinion (non-English) dated Oct. 14, 2021; PCT Application No. PCT/FR2021/051366, Filed Jul. 21, 2021; 5 pages.

* cited by examiner

[Fig. 1]
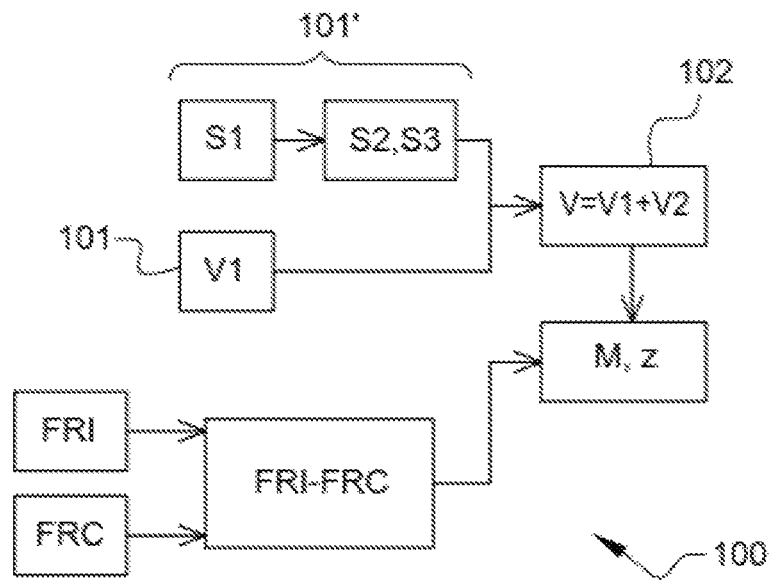
[Fig. 2]
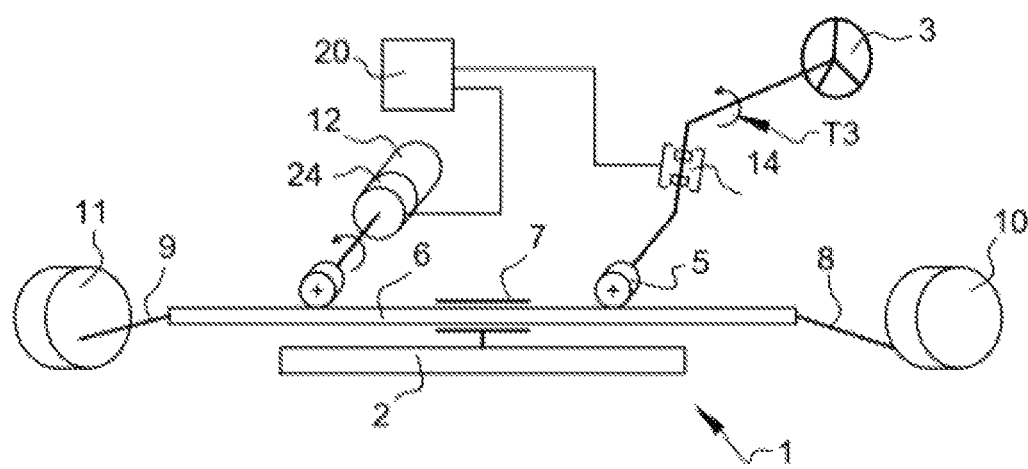

METHOD FOR COMPENSATING FOR FRICTION IN A POWER STEERING SYSTEM

CROSS REFERENCE TO RELATED APPLICATIONS

This application is a National Stage of PCT Application No. PCT/FR2021/051366 filed on Jul. 21, 2021, which claims priority to French Patent Application No. 20/08133 filed on Jul. 30, 2020, the contents each of which are incorporated herein by reference thereto.

TECHNICAL FIELD

The present invention relates to the field of power steering systems, and in particular to methods for compensating for friction.

BACKGROUND

It is known to use a friction model in a power steering system, to at least partially compensate for the friction and reduce the impact of the friction on the driver's feeling. The implementation of this model may nevertheless cause the appearance of instabilities.

The object of the invention is therefore to propose a solution to all or part of these problems.

BRIEF SUMMARY

To this end, the present invention relates to a method for compensating for friction between at least two parts, the method being based on a friction model, a speed v between at least one part and at least one other part of the at least two parts, the speed v being measured, or estimated from a measurement, the speed v being input data of the model, the model being based on an internal state z of friction, a time derivative $\dot{z}$ of the internal state z being a function of said internal state and of the speed v and of a first gain $\sigma$,
the method comprising a step of saturation of the speed v at the input of the friction model, so that an absolute value |v| of the speed v remains lower than a saturation value, the saturation value being a function of the speed, of the first gain and of a second gain;

According to these provisions, the instabilities of the compensation for friction are reduced, or even eliminated.

According to one implementation, the invention comprises one or more of the following characteristics, alone or in a technically acceptable combination.

According to one implementation, the method is implemented digitally, the speed v at the input of the model being sampled over time according to a sampling period $T_e$, and the saturation value is a function of the sampling period $T_e$.

According to one implementation, the saturation value is defined by the equation:

$$|v| < k \frac{g(v)}{T_e \cdot \sigma} \quad \text{[Math 1]}$$

in which k is the second gain, and g(v) is a function of v, representing the steady state friction, the steady state being defined by $\dot{z}=0$.

According to one implementation, the second gain is between 0 and 4, particularly between 1 and 3, in particular equal to 2.

According to one implementation, the time derivative $\dot{z}$ of the internal state z satisfies the equation:

$$\dot{z} = v - \sigma \cdot \frac{|v|}{g(v)} \cdot z \quad \text{[Math 2]}$$

According to one implementation, the function g(v) is a Stribeck function.

According to one implementation, the model is a Lugre model.

According to these provisions, the instabilities of the compensation for friction linked to the digital implementation are reduced or even eliminated, in particular when the function g(v) takes low values, for which the desired level of compensation may be close to zero.

According to one implementation, the at least two parts are parts of a power steering system of a vehicle, the speed v at the input of the model being a steering wheel speed defined as a sum of a first speed and of a second speed, the first speed being a speed of rotation of an electric motor of the power steering system measured by a speed sensor, and the second speed being determined from a steering wheel/driver torque between a steering wheel and a rack of the power steering system, said steering wheel/driver torque being measured by a torque sensor.

According to one implementation, the second speed is determined from a steering wheel/driver torque between the steering wheel and the rack of the power steering system, according to the following sub-steps:
   measurement of the steering wheel/driver torque via the torque sensor configured to measure the torque between the steering wheel and the rack of the power steering system,
   temporal derivation of the measurement of the torque;
   calculation of the second speed, called torque speed, as a function of a determined stiffness applied to the time derivative of the measurement of the torque.

According to one implementation, another input of the friction model is a level of compensation for friction, said compensation level being determined by a difference between an estimated amplitude of friction and a target amplitude of friction.

According to these provisions, the instabilities of the compensation for friction are reduced or even eliminated, in particular when the relative speed becomes high and/or when the desired level of compensation is close to zero and in particular when the method is implemented digitally.

BRIEF DESCRIPTION OF THE DRAWINGS

For its proper understanding, an embodiment and/or implementation of the invention is described with reference to the accompanying drawings representing, by way of non-limiting example, an embodiment or implementation respectively of a device and/or a method according to the invention. The same references in the drawings denote similar elements or elements whose functions are similar.

FIG. 1 is a schematic presentation of the steps of a method for compensating for friction forces according to one implementation of the invention.

FIG. 2 is a schematic representation of a steering device to which the method according to the invention applies.

DETAILED DESCRIPTION

In FIG. 2, a steering device 1 is illustrated comprising a power steering system making it possible to implement the compensation method according to the invention. In a manner known per se, and as can be seen in FIG. 2, said power steering device 1 comprises a steering wheel 3 which allows a driver to maneuver said power steering device 1 by exerting a force, called "steering wheel torque" T3, on said steering wheel 3. Said steering wheel 3 is preferably mounted on a steering column 4, guided in rotation on the vehicle 2, and which meshes, by means of a steering pinion 5, on a steering rack 6, which is itself guided in translation in a steering casing 7 fastened to said vehicle 2.

Preferably, the ends of said steering rack 6 are each linked to a steering tie rod 8, 9 connected to the stub axle of a steered wheel 10, 11 (respectively a left wheel 10 and a right wheel 11), such so that the longitudinal displacement in translation of the rack 6 makes it possible to change the steering angle (yaw angle) of the steered wheels. Moreover, the steered wheels 10, 11 may also preferably be drive wheels.

The power steering device 1 also comprises a motor 12 configured to assist the maneuver of said power steering device 1. The motor 12 will preferably be an electric motor operating in both directions, and preferably a rotary electric motor, of the brushless type or "brushless".

The power steering device 1 further comprises a steering wheel torque sensor 14 set up especially within the power steering device 1, for example on the steering column 4, in order to measure the steering wheel torque T3, and having the main, even exclusively, purpose of providing a measurement of the steering wheel torque T3, regardless of the measurement technology used by said steering wheel torque sensor 14. In addition, the power steering device 1 comprises a motor speed sensor 24 intended to measure the speed of rotation of the motor 12.

Finally, the power steering device 1 also comprises a calculation and control unit 20 configured to implement the compensation method based on data from sensors 14, 24.

The method 100 according to the invention will now be described with reference to the application context of the power steering system presented above by way of non-limiting example. Those skilled in the art will understand that the method according to the invention may be implemented in other applications.

The method 100 according to the invention is in particular applicable to any solution of a technical problem which implements a friction model M between at least two parts 5, 6, mobile with respect to each other, according to a speed v estimated 101' or measured 101 between at least one part 5 and at least one other part 6, the speed v being input data of the model, the model involving an internal state z of friction whose time derivative $\dot{z}$ of the internal state z is a function of said internal state and of the speed v and of a parameterizable gain $\sigma$, that is to say therefore the value may be predetermined.

According to one implementation, the speed v is a relative speed between two parts (5, 6). According to a preferred implementation, the speed v is an estimated speed as a function of at least two speeds v1, v2, measured 101 or estimated 101' at different portions of the power steering system 1, the different portions may be, for example, the motor 12 of the power steering system 1, and the steering wheel 3 of the power steering system, as specified below. The speed v, v1, v2 may be, for example, a speed of rotation, when the parts are mobile in rotation with respect to each other, or a translational speed when the parts are in translation with respect to each other, or even a combination of both.

Thus, for example, the friction model M may be a Lugre model, in which in particular the time derivative $\dot{z}$ of the internal state z satisfies the equation:

$$\dot{z} = v - \sigma \cdot \frac{|v|}{g(v)} \cdot z \quad \text{[Math 2]}$$

in which g(v), is a function of v, representing the steady state friction, the steady state being defined by $\dot{z}=0$.

The function g(v) can in particular be the Stribeck function, representative of a desired level of compensation for friction.

Advantageously, the LuGre model does not present any discontinuity problem. The LuGre model uses an integration principle and has properties for representing friction cycles, while allowing to have a certain continuity on intermediate friction rates.

According to one implementation, the method is implemented digitally, in the sense that the speed v at the input of the model is sampled over time according to a sampling period $T_e$.

Thus, in this example of implementation, an oscillatory instability may appear when the term $$\sigma \cdot \frac{|v|}{g(v)}$$

or me preceding equation becomes too large, in particular for values of g(v), that is to say for desired levels of compensation for friction close to zero.

To avoid this instability, the method comprises a step 102 of dynamic saturation of the speed v at the input of the friction model M, so that an absolute value |v| of the speed v remains lower than a saturation value, the saturation value being a function of the speed, of the gain and of a second gain k.

Thus, in particular in the case of a digital implementation of the method, the saturation value can be defined by the equation:

$$|v| < k \frac{g(v)}{T_e \cdot \sigma} \quad \text{[Math 1]}$$

According to one implementation, the second gain is between 0 and 4, preferably between 1 and 3, more preferably the second gain is equal to 2.

According to these provisions, the instabilities of the compensation for friction linked to the digital implementation of the method, in particular when the function g(v) takes low values, for which the desired level of compensation may be close to zero, are reduced or even removed.

According to a particular implementation of the invention, illustrated in more detail in FIG. 1, the speed v at the input of the friction model is a steering wheel speed defined as a sum of a first speed v1 and of a second speed v2.

For example, the first speed is a speed of the electric motor 12 of the power steering system 1 measured 101 by a speed sensor 24, and the second speed being determined 101' from the steering wheel/driver torque T3 between the steering wheel 3 and the rack 6 of the power steering system 1, said steering wheel/driver torque T3 being measured by the steering wheel torque sensor 14.

The determination 101' of the second speed, corresponding to the steering wheel/driver torque T3, according to an estimation method 101' which will be specified below by way of example, makes it possible to take into account the very low loads of the driver on the steering wheel 3. Indeed, on the very low loads of the driver, friction present between the steering wheel 3 and the electric motor 12, linked to the various parts and mechanical meshings of the power steering system, prevents a load on the electric motor 12. Thus the first speed is zero.

The determination of a second speed thus makes it possible to take into account and therefore to effectively compensate for the friction of the power steering system 1 for low loads of the driver on the steering wheel 3.

The sum of the first speed and of the second speed makes it possible to take into account both the low loads of the driver on the steering wheel 3, via the second speed, and the low loads rising from the running surface and directly biasing the rack 6, via first speed.

The second speed may for example be determined 101' according to the following sub-steps:
- (S1) measurement of the steering wheel/driver torque T3 via the torque sensor 14 configured to measure the torque T3 between the steering wheel 3 and the rack 6 of the power steering system 1,
- (S2) temporal derivation of the measurement of the torque T3;
- (S3) obtaining of the second speed, called torque speed, as a function of a determined stiffness applied to the time derivative of the measurement of the torque, the application of the determined stiffness to the time derivative of the measurement of the torque consisting in calculating the product of the stiffness determined by the time derivative of the measurement of the torque.

According to one implementation, second input data of the friction model may be a desired level of compensation for friction, said compensation level being determined by a difference between an estimated amplitude FRI of friction and a target amplitude of friction FRC. The methods for estimating the amplitude of friction are well known to those skilled in the art.

According to the implementation of the method for compensating for friction which has just been described above with reference to FIG. 1, the Stribeck function g(v) can take very low values because the desired level of compensation may be close to zero.

This makes the occurrence of numerical instabilities in the model much more probable, hence the need to develop the countermeasure according to the invention, based on the step of saturation of the relative speed, the considered relative speed then being a composite steering wheel speed, defined as a sum of the first speed v1 and of a second speed v2.

The method according to the invention is however applicable to any situation where a friction model could present numerical instabilities.

The invention claimed is:

1. A method for compensating for friction between at least two parts, the method being based on a friction model (M), a speed (v) between at least one part and at least one other part of the at least two parts, the speed (v) being measured, and estimated from a measurement, the speed (v) being input data of the friction model (M), the friction model (M) being based on an internal state (z) of friction, a time derivative ($\dot{z}$) of the internal state (z) being a function of the internal state and of the speed (v) and of a first gain ($\sigma$), the method comprising a step of saturation of the speed (v) at an input of the friction model, so that an absolute value |v| of the speed (v) remains lower than a saturation value, the saturation value being a function of the speed, of the first gain and of a second gain, wherein the at least two parts are parts of a power steering system of a vehicle, the speed (v) at the input of the friction model being a steering wheel speed defined as a sum of a first speed (v1) and of a second speed (v2), the first speed (v1) being a speed of rotation of an electric motor of the power steering system measured by a speed sensor, and the second speed (v2) being estimated from a steering wheel/driver torque (T3) between a steering wheel and a rack of the power steering system, the steering wheel/driver torque (T3) being measured by a torque sensor.

2. The method according to claim 1, wherein the second speed (v2) is estimated from a steering wheel/driver torque (T3) between the steering wheel and a rack of the power steering system, according to the following sub-steps:
- (S1) measurement of the steering wheel/driver torque (T3) via the torque sensor configured to measure the torque (T3) between the steering wheel and the rack of the power steering system,
- (S2) temporal derivation of the measurement of the torque (T3);
- (S3) calculation of the second speed (V2), called torque speed, as a function of a determined stiffness applied to the time derivative of the measurement of the torque (T3).

3. The method according to claim 2, the method being implemented digitally, the speed v at the input of the friction model being sampled over time according to a sampling period $T_e$, wherein the saturation value is a function of the sampling period $T_e$.

4. The method according to claim 3, wherein the saturation value is defined by the equation:

$$|v| < k \frac{g(v)}{T_e \cdot \sigma} \quad \text{[Math 1]}$$

in which k is the second gain and g(v), is a function of v, representing a steady state friction, the steady state friction being defined by z=0.

5. The method according to claim 4, wherein the time derivative $\dot{z}$ of the internal state z satisfies the equation:

$$\dot{z} = v - \sigma \cdot \frac{|v|}{g(v)} \cdot z. \quad \text{[Math 2]}$$

6. The method according to claim 5, wherein the function g(v) is a Stribeck function.

7. The method according to claim 6, wherein another input of the friction model is a level of compensation for friction, the level of compensation for friction being determined by a difference between an estimated amplitude of friction and a predetermined target amplitude of friction.

8. The method according to claim 3, wherein another input of the friction model is a level of compensation for friction, the level of compensation for friction being determined by a difference between an estimated amplitude of friction and a predetermined target amplitude of friction.

9. The method according to claim 2, wherein another input of the friction model is a level of compensation for friction, the level of compensation for friction being determined by a difference between an estimated amplitude of friction and a predetermined target amplitude of friction.

10. The method according to claim 1, the method being implemented digitally, the speed v at the input of the friction model being sampled over time according to a sampling period $T_e$, wherein the saturation value is a function of the sampling period $T_e$.

11. The method according to claim 10, wherein the saturation value is defined by the equation:

$$|v| < k \frac{g(v)}{T_e \cdot \sigma} \qquad \text{[Math 1]}$$

in which k is the second gain and g(v), is a function of v, representing a steady state friction, the steady state friction being defined by z=0.

12. The method according to claim 11, wherein the time derivative ż of the internal state z satisfies the equation:

$$\dot{z} = v - \sigma \cdot \frac{|v|}{g(v)} \cdot z \qquad \text{[Math 2]}$$

13. The method according to claim 12, wherein the function g(v) is a Stribeck function.

14. The method according to claim 13, wherein another input of the friction model is a level of compensation for friction, the level of compensation for friction being determined by a difference between an estimated amplitude of friction and a predetermined target amplitude of friction.

15. The method according to claim 12, wherein another input of the friction model is a level of compensation for friction, the level of compensation for friction being determined by a difference between an estimated amplitude of friction and a predetermined target amplitude of friction.

16. The method according to claim 11, wherein the function g(v) is a Stribeck function.

17. The method according to claim 16, wherein another input of the friction model is a level of compensation for friction, the level of compensation for friction being determined by a difference between an estimated amplitude of friction and a predetermined target amplitude of friction.

18. The method according to claim 11, wherein another input of the friction model is a level of compensation for friction, the level of compensation for friction being determined by a difference between an estimated amplitude of friction and a predetermined target amplitude of friction.

19. The method according to claim 10, wherein another input of the friction model is a level of compensation for friction, the level of compensation for friction being determined by a difference between an estimated amplitude of friction and a predetermined target amplitude of friction.

20. The method according to claim 1, wherein another input of the friction model is a level of compensation for friction, the level of compensation for friction being determined by a difference between an estimated amplitude of friction and a predetermined target amplitude of friction.

* * * * *